(12) United States Patent
Jiang et al.

(10) Patent No.: US 12,399,596 B2
(45) Date of Patent: Aug. 26, 2025

(54) TOUCH DISPLAY APPARATUS

(71) Applicant: AUO Corporation, Hsinchu (TW)

(72) Inventors: Tian-Jing Jiang, Hsinchu (TW); Yueh-Chi Wu, Hsinchu (TW); Hung-Chia Liao, Hsinchu (TW); Ti-Kuei Yu, Hsinchu (TW); Ya-Ling Hsu, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/908,754

(22) Filed: Oct. 7, 2024

(65) Prior Publication Data

US 2025/0251838 A1    Aug. 7, 2025

(30) Foreign Application Priority Data

Feb. 5, 2024 (TW) ................ 113104439

(51) Int. Cl.
*G06F 3/041* (2006.01)
*G06F 3/044* (2006.01)

(52) U.S. Cl.
CPC .......... *G06F 3/0448* (2019.05); *G06F 3/0412* (2013.01)

(58) Field of Classification Search
None
See application file for complete search history.

(56) References Cited

U.S. PATENT DOCUMENTS

2023/0341984 A1   10/2023  Pang et al.
2024/0176454 A1*   5/2024  Hasegawa ............... G06F 3/041

FOREIGN PATENT DOCUMENTS

CN    115206197    10/2022
CN    115485655    12/2022
CN    115756209     3/2023

* cited by examiner

*Primary Examiner* — Brian M Butcher
(74) *Attorney, Agent, or Firm* — JCIPRNET

(57) ABSTRACT

A touch display apparatus includes a display panel, first light-emitting elements and a first conductive layer. The first light-emitting elements are disposed on a first auxiliary display area of the display panel. The first conductive layer is disposed on the display panel and includes first mesh-shaped touch electrodes and first dummy electrodes. Each of the first dummy electrodes is disposed between two adjacent first mesh-shaped touch electrodes and is structurally separated from the two adjacent first mesh-shaped touch control electrodes. At least one portion of the first dummy electrode is electrically connected to at least one of the first light-emitting elements disposed in the first auxiliary display area.

7 Claims, 6 Drawing Sheets

TOUCH DISPLAY APPARATUS

CROSS-REFERENCE TO RELATED APPLICATION

This application claims the priority benefit of Taiwan application serial no. 113104439, filed on Feb. 5, 2024. The entirety of the above-mentioned patent application is hereby incorporated by reference herein and made a part of this specification.

BACKGROUND

Technical Field

The disclosure relates to a display apparatus, and in particular to a touch display apparatus.

Description of Related Art

In order to meet the needs of users for displaying various shared information and comprehensive information in a large area, spliced display devices with multiple display panels integrated have been widely used in various fields. For example, spliced display devices are commonly used in public information display areas (such as large advertisements, monitoring and management screens, etc.). However, spliced display devices usually have the problem of discontinuity in the overall display image, which affects the viewing quality. Therefore, light-emitting elements can be provided on at least one side of the auxiliary display area of the display panel to eliminate joints in the spliced display device. However, the arrangement of circuits for driving the light-emitting elements will make the overall thickness of the display device thicker and complicate the manufacturing process.

SUMMARY

This disclosure provides a touch display apparatus with good performance.

A touch display apparatus of this disclosure includes a display panel, a plurality of first light-emitting elements and a first conductive layer. The display panel has a main display area and a first auxiliary display area outside the main display area. The first light-emitting elements are arranged on the first auxiliary display area of the display panel. The first conductive layer is disposed on the display panel and comprises a plurality of first mesh-shaped touch electrodes and a plurality of first dummy electrodes. The first mesh-shaped touch electrodes are located on the main display area of the display panel. The first dummy electrodes are located on the main display area of the display panel. Each of the first dummy electrodes is disposed between two adjacent first mesh-shaped touch electrodes of the first mesh-shaped touch electrodes and structurally separated from the two adjacent first mesh-shaped touch electrodes. At least one portion of the each of the first dummy electrodes is electrically connected to at least one of the first light-emitting elements disposed in the first auxiliary display area.

DESCRIPTION OF THE EMBODIMENTS

Figure 1:
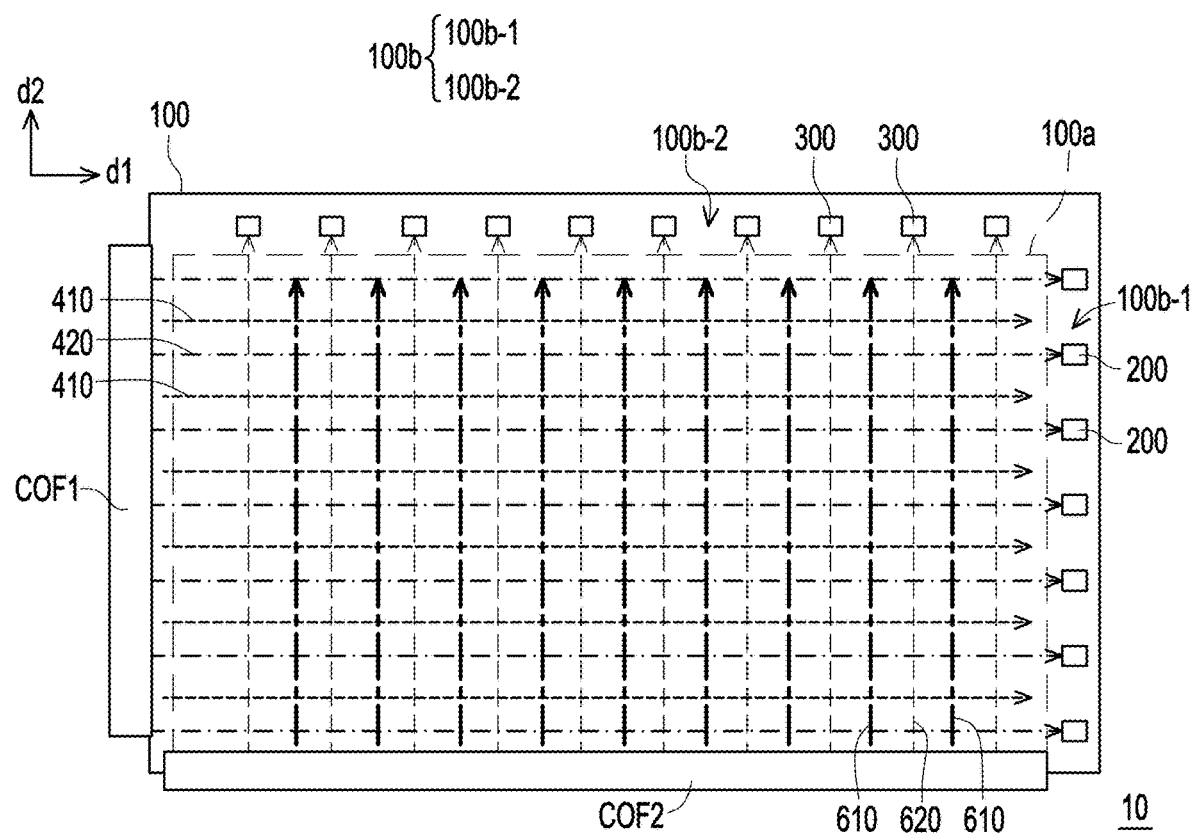
FIG. 1 is a top view of a touch display apparatus according to an embodiment of the present disclosure.

Reference will now be made in detail to exemplary embodiments provided in the disclosure, examples of which are illustrated in accompanying drawings. Wherever possible, identical reference numerals are used in the drawings and descriptions to refer to identical or similar parts.

It should be understood that when a device such as a layer, film, region or substrate is referred to as being "on" or "connected to" another device, it may be directly on or connected to another device, or intervening devices may also be present. In contrast, when a device is referred to as being "directly on" or "directly connected to" another device, there are no intervening devices present. As used herein, the term "connected" may refer to physical connection and/or electrical connection. Besides, if two devices are "electrically connected" or "coupled", it is possible that other devices are present between these two devices.

The term "about," "approximately," or "substantially" as used herein is inclusive of the stated value and a mean within an acceptable range of deviation for the particular value as determined by people having ordinary skill in the art, considering the measurement in question and the error associated with measurement of the particular quantity (i.e., the limitations of the measurement system). For example, "about" may mean within one or more standard deviations, for example, ±30%, ±20%, ±10%, or ±5% of the stated value. Moreover, a relatively acceptable range of deviation or standard deviation may be chosen for the term "about," "approximately," or "substantially" as used herein based on optical properties, etching properties or other properties, instead of applying one standard deviation across all the properties.

Unless otherwise defined, all terms (including technical and scientific terms) used herein have the same meaning as commonly understood by people of ordinary skill in the art. It will be further understood that terms, such as those defined in the commonly used dictionaries, should be interpreted as having a meaning that is consistent with their meaning in the context of the relevant art and the invention and will not be interpreted in an idealized or overly formal sense unless expressly so defined herein.

Figure 2:
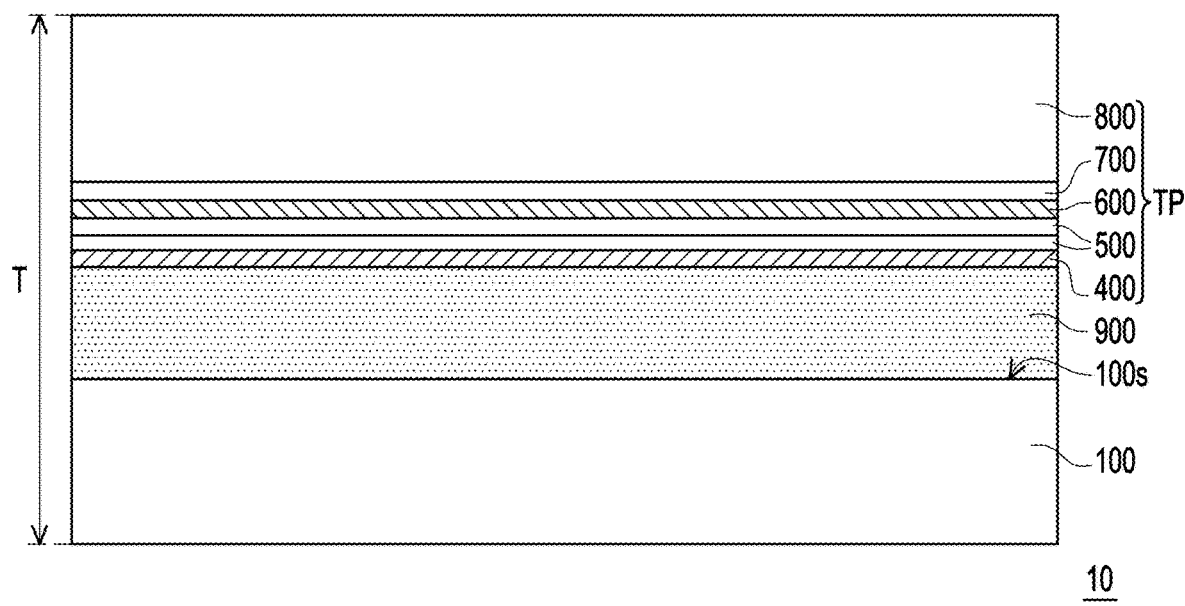
FIG. 2. is a schematic cross-sectional view of a touch display apparatus according to an embodiment of the present disclosure.
Figure 3:
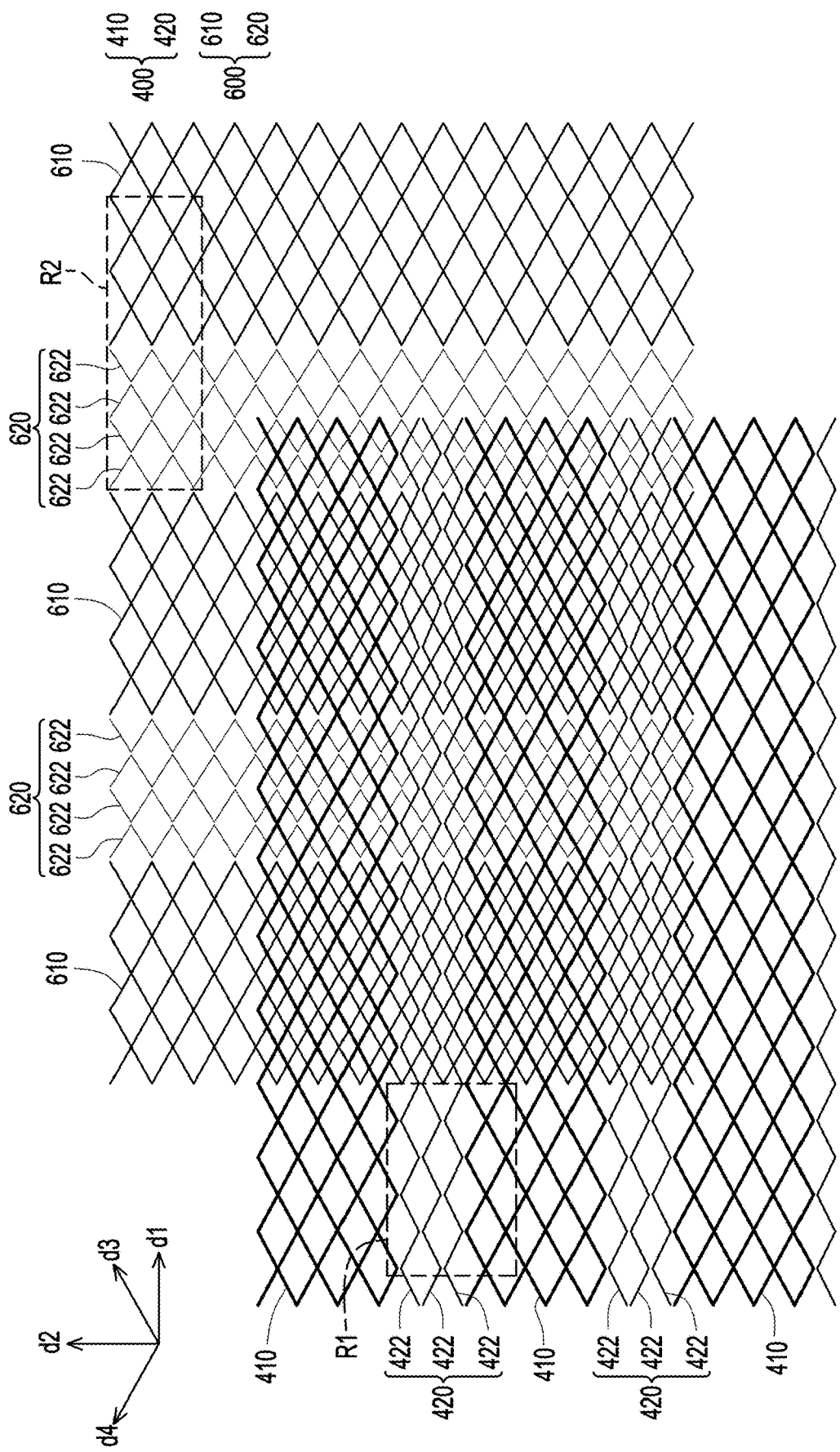
FIG. 3. is a top view and enlarged schematic diagram of the first mesh-shaped touch electrode, first dummy electrode, second mesh-shaped touch electrode and second dummy electrode according to one embodiment of this disclosure.

FIG. 1 is a top view of a touch display apparatus according to an embodiment of the present disclosure. FIG. 2. is a schematic cross-sectional view of a touch display apparatus according to an embodiment of the present disclosure. FIG. 3. is a top view and enlarged schematic diagram of the first mesh-shaped touch electrode, first dummy electrode, second mesh-shaped touch electrode and second dummy electrode according to one embodiment of this disclosure.

It should be noted that FIG. 1 uses multiple arrows to represent the first mesh-shaped touch electrode 410, the first dummy electrode 420, the second mesh-shaped touch electrode 610 and the second dummy electrode 620 to concisely express the relative relationship between the first mesh-shaped touch electrodes 410, the first dummy electrodes 420, the second mesh-shaped touch electrodes 610, the second dummy electrodes 620, the first light-emitting elements 200 and the second light-emitting elements 300. However, the shapes of the first mesh-shaped touch electrode 410, the first dummy electrode 420, the second mesh-shaped touch electrodes 610 and the second dummy electrodes 620 are not the multiple arrows shown in FIG. 1. The shapes of the first mesh-shaped touch electrode 410, the first dummy electrode 420, the second mesh-shaped touch electrodes 610 and the second dummy electrodes 620 may be referred to FIG. 3.

Referring to FIG. 1, FIG. 2 and FIG. 3, the touch display apparatus 10 includes a display panel 100. The display panel 100 has a main display area 100a and an auxiliary display area 100b outside the main display area 100a. In one embodiment, the display panel 100 has pixel electrodes arranged in a unit cell (cell), the main display area 100a may refer to an area occupied by the pixel electrodes, and the auxiliary display area 100b may refer to an area of the display panel 100 not occupied by the pixel electrodes. In one embodiment, the auxiliary display area 100b includes a first auxiliary display area 100b-1, wherein the main display area 100a and the first auxiliary display area 100b-1 are arranged in the first direction d1. In one embodiment, the auxiliary display area 100b may optionally further include a second auxiliary display area 100b-2, and the main display area 100a and the second auxiliary display area 100b-2 are arranged in the second direction d2, wherein the first direction d1 and the second direction d2 are intersected. For example, in one embodiment, the first auxiliary display area 100b-1 may be a straight strip area located on the right or left side of the main display area 100a, the second auxiliary display area 100b-2 may be a horizontal strip area located on the upper or lower side of the main display area 100a, the first auxiliary display area 100b-1 and the second auxiliary display area 100b-2 may form an L-shaped area, but this disclosure is not limited to thereto. In one embodiment, the display panel 100 is, for example, a liquid crystal display panel, but this disclosure is not limited to thereto.

Referring to FIG. 1, the touch display apparatus 10 further includes first light-emitting elements 200 arranged on the first auxiliary display area 100b-1 of the display panel 100. In one embodiment, the first light-emitting element 200 is, for example, a micro light-emitting diode (μLED), but this disclosure is not limited to thereto. In one embodiment, the touch display apparatus 10 may also optionally include second light-emitting elements 300 disposed on the second auxiliary display area 100b-2 of the display panel 100. In one embodiment, the second light-emitting element 300 is, for example, a micro light-emitting diode (μLED), but this disclosure is not limited to thereto. When the touch display apparatus 10 is spliced with other display apparatus/other touch display apparatus to form a spliced display apparatus (not shown) with a large display screen, a light beam emitted by the first light-emitting element 200 and/or the second light-emitting element 300 can be used to eliminate the splicing seams between the touch display apparatus 10 and other display apparatus/other touch display apparatus to improve the picture quality of the spliced display apparatus.

Referring to FIGS. 1 and 2, the touch display apparatus 10 further includes a first conductive layer 400 disposed on the display panel 100. In one embodiment, the touch display apparatus 10 further includes at least one insulation layer 500 and a second conductive layer 600, wherein at least one insulation layer 500 is disposed on the first conductive layer 400, and the second conductive layer 600 is disposed on at least one insulation layer 500. In one embodiment, the first conductive layer 400 and the second conductive layer 600 are made of metal, for example, but this disclosure is not limited to thereto.

In one embodiment, the touch display apparatus 10 may further selectively include a dielectric layer 700 and a transparent protective cover 800. The dielectric layer 700 is disposed on the second conductive layer 600, and the transparent protective cover 800 is disposed on the dielectric layer 700. In one embodiment, the dielectric layer 700, the second conductive layer 600, at least one insulation layer 500 and the first conductive layer 400 may be sequentially formed on the transparent protective cover 800 to form a touch substrate TP, and the touch substrate TP may be attached to the outer surface 100s of the display panel 100 through the optical adhesive 900. However, this disclosure is not limited to thereto. In another embodiment not shown, the first conductive layer 400, at least one insulation layer 500, the second conductive layer 600 and a protective layer (not shown) may be sequentially formed on the outer surface 100s of the display panel 100 so as to form a touch panel on cell structure.

Referring to FIGS. 1, 2 and 3, the first conductive layer 400 includes first mesh-shaped touch electrodes 410 and first dummy electrodes 420 located on the main display area 100a of the display panel 100, wherein each of the first dummy electrode 420 is disposed between two adjacent first mesh-shaped touch electrodes 410 and is structurally separated from the two adjacent first mesh-shaped touch electrodes 410. Each of the first mesh-shaped touch electrodes 410 extends substantially in a first direction d1, and the first mesh-shaped touch electrodes 410 are arranged in a second direction d2 intersected with the first direction d1.

It is worth noting that at least one portion of the first dummy electrode 420 is electrically connected to at least one first light-emitting element 200 disposed in the first auxiliary display area 100b-1. In other words, in addition to improving the visual effect, the first dummy electrode 420 can also be used as a circuit to drive the first light-emitting element 200. Thereby, while eliminating splicing seams by using the first light-emitting element 200 located in the first auxiliary display area 100b-1, the touch display apparatus 10 does not need to add additional film layers for setting up circuits for driving the first light-emitting element 200, the thickness T of the touch display apparatus 10 can be reduced, and the manufacturing process of the touch display apparatus 10 can be simplified.

Figure 4:
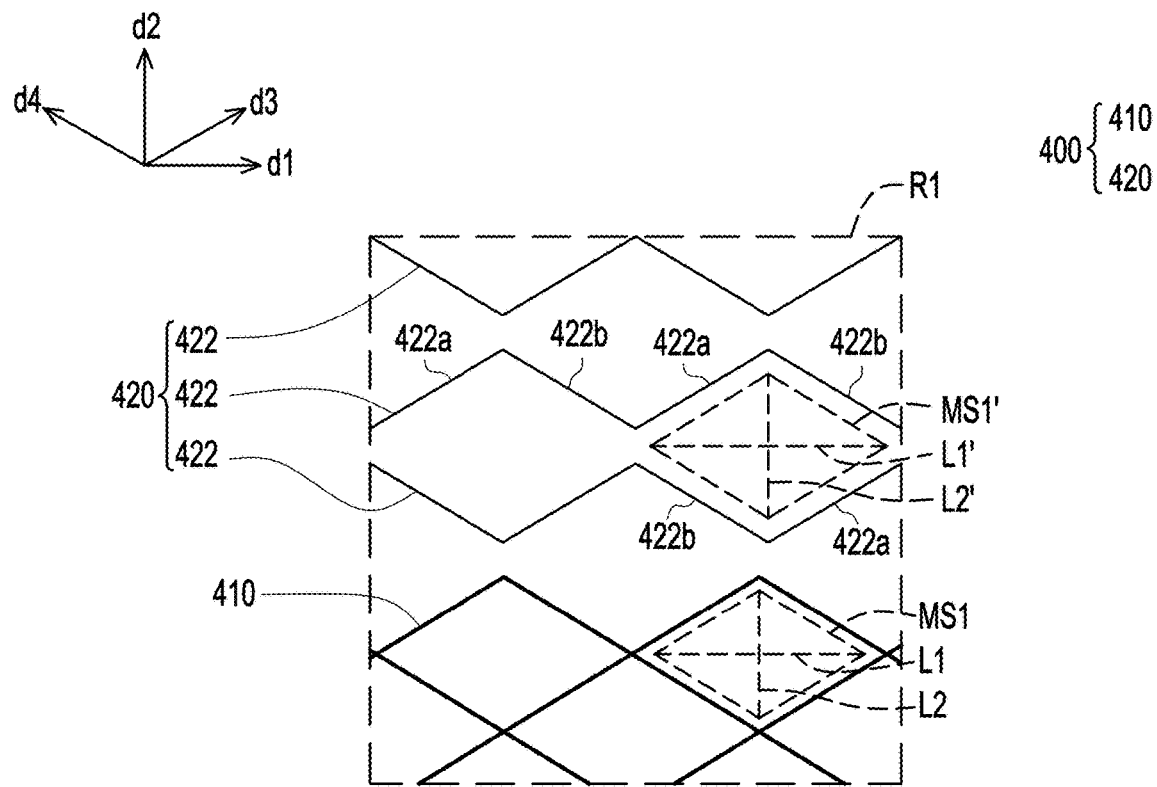
FIG. 4. is a partially enlarged schematic diagram of the first conductive layer of an embodiment of the present disclosure.

FIG. 4 is a partially enlarged schematic diagram of the first conductive layer of an embodiment of the present disclosure. FIG. 4 corresponds to local R1 of FIG. 3. Referring to FIGS. 1, 3 and 4, in one embodiment, the first dummy electrode 420 disposed between two adjacent first mesh-shaped touch electrodes 410 may include first conductive portions 422 structurally separated from each other, and the first conductive portions 422 of the first dummy electrode 420 are electrically connected to the first light-emitting elements 200 disposed in the first auxiliary display area 100b-1. In one embodiment, the touch display apparatus 10 may further optionally include a first driving element COF1, one end of each of the first conductive portions 422 may be electrically connected to the first driving element COF1, and the other end of each of the first conductive portions 422 may be electrically connected to a corresponding at least one first light-emitting element 200. In one embodiment, the first driving element COF1 may include a chip, and the chip may be bonded to the display panel 100 through a Chip On Film (COF) package, but this disclosure is not limited to thereto.

Referring to FIG. 3 and FIG. 4, in one embodiment, each of the first conductive portion 422 may include first line segments 422a and second line segments 422b, the first line segments 422a and the second line segments 422b are alternately arranged and connected in series with each other, the first line segments 422a are substantially parallel to each other and extend in a third direction d3, the first direction d1 and the second direction d2 are substantially perpendicular, the third direction d3, the first direction d1 and the second direction d2 are intersected, and the second line segments 422b are substantially parallel to each other and extend in a fourth direction d4, and the fourth direction 4 intersects with the first direction d1, the second direction d2 and the third direction d3. In one embodiment, the first line segments 422a and the second line segments 422b of each of the first conductive portion 422 may be connected to form a zigzag-shaped wire.

Referring to FIGS. 3 and 4, in one embodiment, the first conductive portions 422 of the first dummy electrode 420 define first dummy grids MS1'. Specifically, in one embodiment, a first line segment 422a of a first conductive portion 422 is disposed opposite a first line segment 422a of another adjacent first conductive portion 422, and a second line segment 422b of the first conductive portion 422 is disposed opposite a second line segment 422b of the another adjacent first conductive portion 422 to define a first dummy grid MS1'.

In one embodiment, a shape of the first dummy grid MS1' defined by the two adjacent first conductive portions 422 of the first dummy electrode 420 is substantially the same as a shape of the first grid MS1 of the first mesh-shaped touch electrode 410, and a size of the first dummy grid MS1' is substantially the same as a size of the first grid MS1 of the first mesh-shaped touch electrode 410. For example, in one embodiment, the shapes of the first dummy grid MS1' and the first grid MS1 may both be rhombus, and lengths of the two diagonals L1' and L2' of the rhombus-shaped first dummy grid MS1' are substantially equal to lengths of the two diagonals L1 and L2 of the rhombus-shaped first grid MS1 respectively.

Referring to FIG. 1 and FIG. 3, in one embodiment, the second conductive layer 600 includes second mesh-shaped touch electrodes 610 and second dummy electrodes 620 disposed on the main display area 100a of the display panel 100, the second mesh-shaped touch electrodes 610 and the first mesh-shaped touch electrodes 410 are intersected, each of the second dummy electrode 620 is disposed between two adjacent second mesh-shaped touch electrodes 610, each of the second dummy electrode 620 and the two adjacent second mesh-shaped touch electrodes 610 are structurally separated from each other.

It is worth noting that at least one portion of the second dummy electrode 620 is electrically connected to at least one second light-emitting element 300 disposed in the second auxiliary display area 100b-2. In other words, in addition to improving the visual effect, the second dummy electrode 620 can also be used as a circuit to drive the second light-emitting element 300. Thereby, while using the second light-emitting element 300 located in the second auxiliary display area 100b-2 to eliminate splicing seams, the touch display apparatus 10 does not need to add additional film layers for setting up circuits for driving the second light-emitting element 300, the thickness T of the touch display apparatus 10 is not too thick, and the manufacturing process of the touch display apparatus 10 can be simplified.

Figure 5:
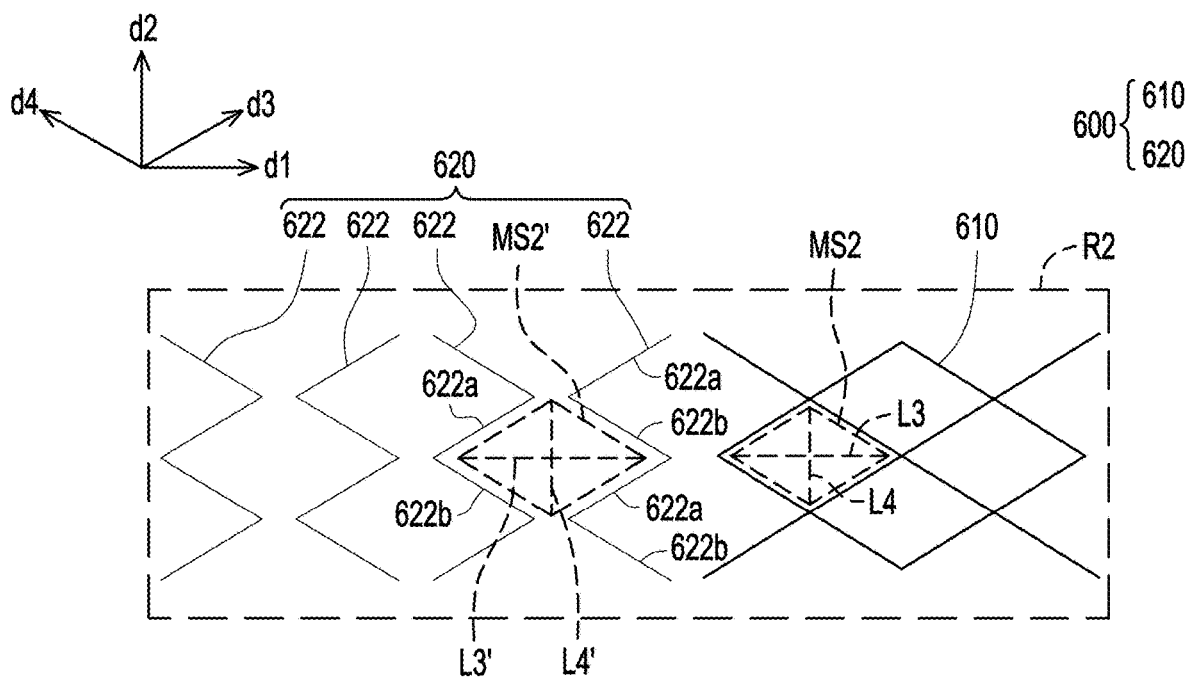
FIG. 5. is a partial enlarged schematic diagram of the second conductive layer of an embodiment of the present disclosure.

FIG. 5 is a partial enlarged schematic diagram of the second conductive layer of an embodiment of the present disclosure. FIG. 5 corresponds to local R2 in FIG. 3. Referring to FIGS. 1, 3 and 5, the second conductive layer 600 includes second mesh-shaped touch electrodes 610 and second dummy electrodes 620 located on the main display area 100a of the display panel 100, wherein each of the second dummy electrodes 620 is disposed on two adjacent second mesh-shaped touch electrodes 610, and the each of the second dummy electrodes 620 and the two adjacent second mesh-shaped touch electrodes 610 are structurally separated from each other. Each of the second mesh-shaped touch electrodes 610 substantially extends in the second direction d2, and the second mesh-shaped touch electrodes 610 are arranged in the first direction d1. One of the first mesh-shaped touch electrode 410 and the second mesh-shaped touch electrode 610 is a driving electrode (Tx), and the other of the first mesh-shaped touch electrode 410 and the second mesh-shaped touch electrode 610 is a receiving electrode (Rx).

In one embodiment, the second dummy electrode 620 disposed between two adjacent second mesh-shaped touch electrodes 610 may include second conductive portions 622 that are structurally separated from each other, and the second conductive portions 622 of the second dummy electrode 620 are electrically connected to the second light-emitting elements 300 disposed in the second auxiliary display area 100b-2. In one embodiment, the touch display apparatus 10 may further optionally include a second driving element COF2, one end of each of the second conductive portion 622 may be electrically connected to the second driving element COF2, and the other end of the each of the second conductive portion 622 may be electrically connected to the corresponding a least one second light-emitting element 300. In one embodiment, the second driving element COF2 may include a chip, and the chip may be bonded to the display panel 100 through a Chip On Film (COF) package, but this disclosure is not limited to thereto.

Referring to FIG. 3 and FIG. 5, in one embodiment, each of the second conductive portion 622 may include first line segments 622a and second line segments 622b, the first line segments 622a and the second line segments 622b are alternately arranged and connected in series with each other, the first line segments 622a are substantially parallel to each other and extend in the third direction d3, and the second line segments 622b are substantially parallel to each other and extend in the fourth direction d4. In one embodiment, the first line segments 622a and the second line segments 622b of each of the second conductive portion 622 may be connected to form a zigzag-shaped wire.

Referring to FIGS. 3 and 5, in one embodiment, the second conductive portions 622 of the second dummy electrode 620 define second dummy grids MS2'. Specifically, in one embodiment, a first line segment 622a of a second conductive portion 622 is disposed opposite a first line segment 622a of another adjacent second conductive portion 622, and a second line segment 622b of the first conductive portion 422 is disposed opposite a second line segment 622b of the another adjacent first conductive portion 422 to define a second dummy grid MS2'.

In one embodiment, a shape of the second dummy grid MS2' defined by the two adjacent second conductive portions 622 of the second dummy electrode 620 is substantially the same as a shape of the second grid MS2 of the second mesh-shaped touch electrode 610, and a size of the second dummy grid MS2' is the same as a size of the second grid MS2 of the second mesh-shaped touch electrode 610 is substantially the same. For example, in one embodiment, the shapes of second dummy grid MS2' and the second grid MS2 may both be rhombus, and lengths of the two diagonals L3' and L4' of the rhombus-shaped second dummy grid MS2' are substantially equal to lengths of the two diagonals L3 and L4 of the rhombus-shaped second grid MS2 respectively.

Referring to FIG. 3, in one embodiment, n first conductive portions 422 are disposed between two adjacent first mesh-shaped touch electrodes 410, and m second conductive portions 422 are disposed between two adjacent second mesh-shaped touch electrodes 610. wherein n and m are positive integers greater than or equal to 1. For example, in one embodiment, n=3 and m=4. However, this disclosure is not limited to thereto. The values of n and m may be adjusted depending on the resolution.

In the following embodiment, the reference numerals and part of the description of the foregoing embodiment are applied, where the same reference numerals are used to indicate the same or similar components, and descriptions of the same technical contents are omitted. Reference may be made to the foregoing embodiment for the omitted descriptions, which will not be repeated in following embodiment.

Figure 6:
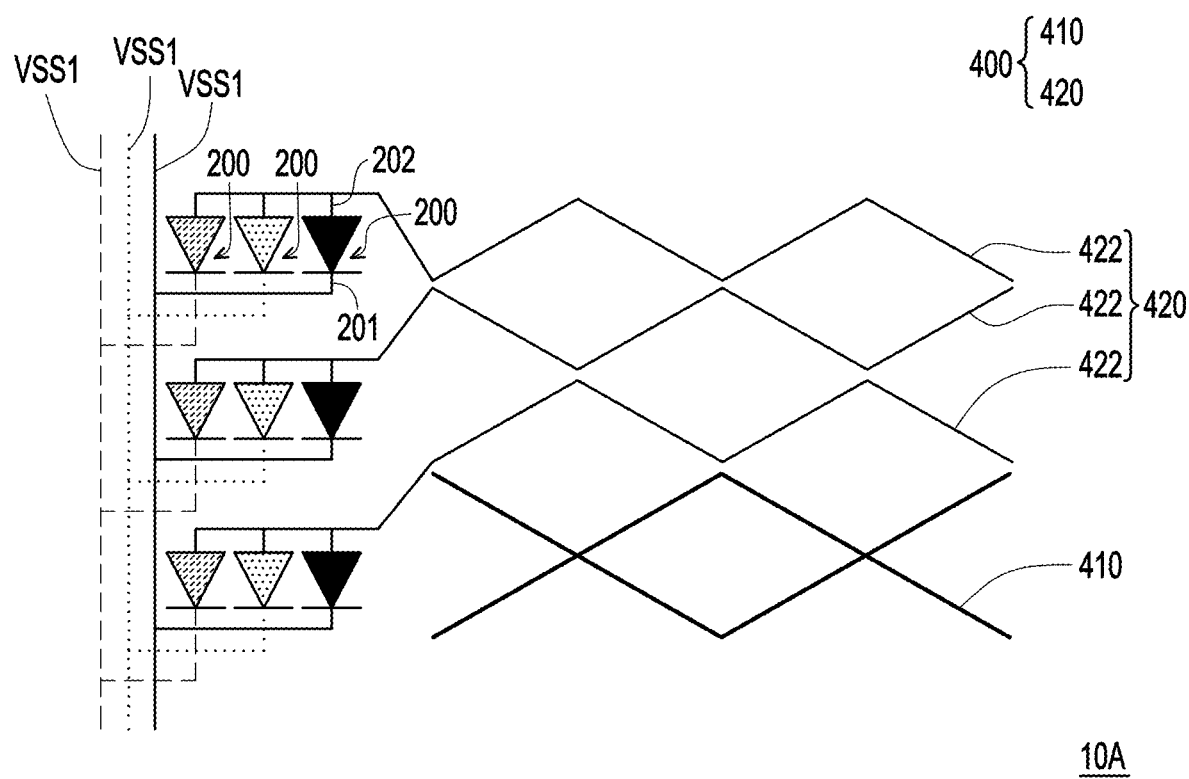
FIG. 6. is a schematic top view of the first mesh-shaped touch electrode, first dummy electrode, first light-emitting element and first signal line of the touch display apparatus according to another embodiment of the present disclosure.

FIG. 6 is a schematic top view of the first mesh-shaped touch electrode, first dummy electrode, first light-emitting element and first signal line of the touch display apparatus according to another embodiment of the present disclosure. The touch display apparatus 10A of FIG. 6 is similar to the aforementioned touch display apparatus 10. The difference between the two is that in the embodiment of FIG. 6, a first conductive portion 422 of the first dummy electrode 420 may be electrically connected to a plurality of first light-emitting elements 200, first ends 201 of the first light-emitting element 200 are electrically connected to first signal lines VSS1 respectively, and second ends 202 of the first light-emitting elements 200 are electrically connected to the same first conductive portion 422. That is to say, when the resolution of the touch display apparatus 10B is improved, the first light-emitting elements 200 may share a first conductive portion 422 so as to simplify the circuit design for driving the first light-emitting element 200, wherein the number of the first light-emitting elements 200 sharing the same first conductive portion 422 depends on actual needs.

Figure 7:
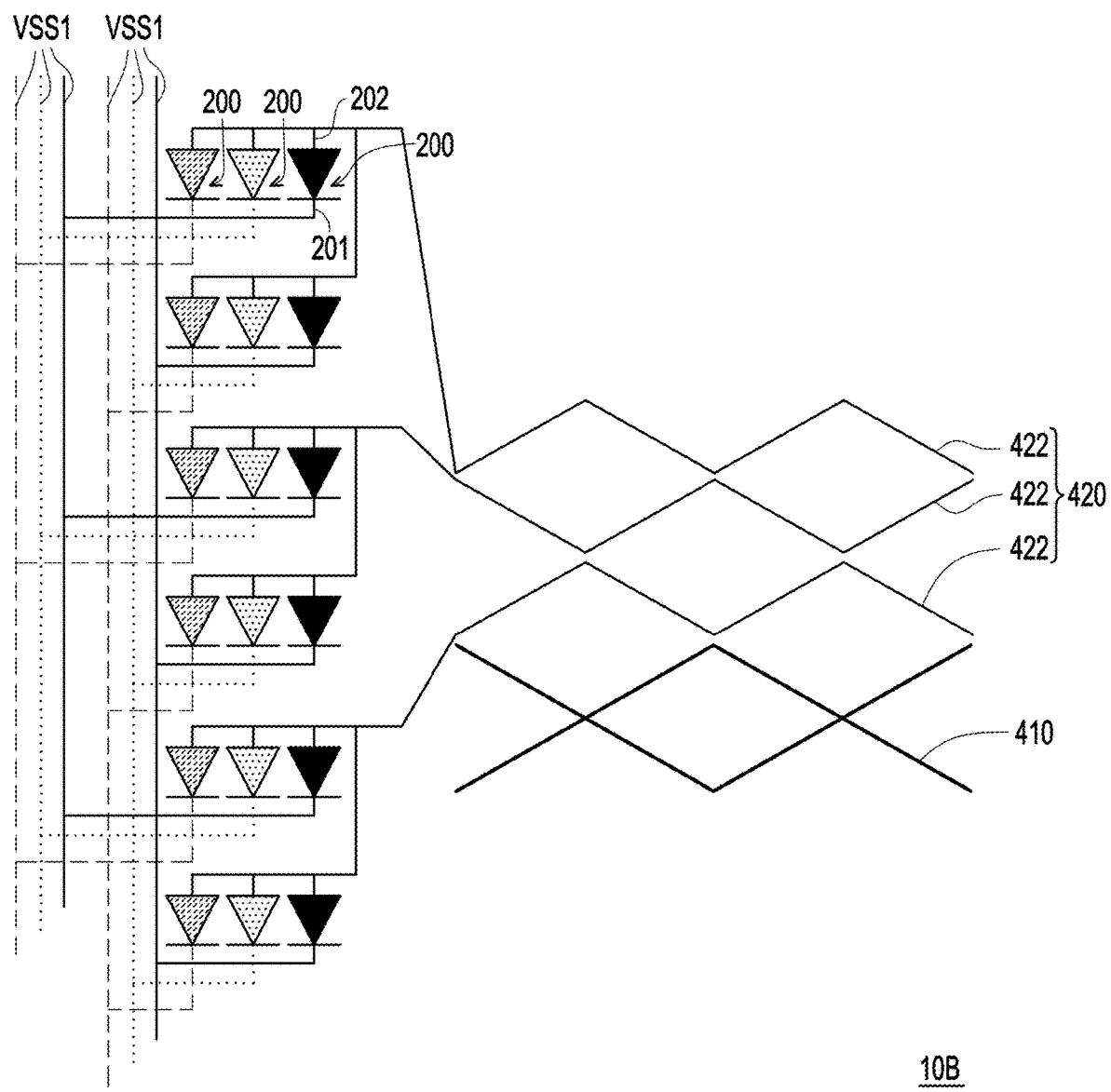
FIG. 7. is a schematic top view of the first mesh-shaped touch electrode, first dummy electrode, first light-emitting element and first signal line of the touch display apparatus according to another embodiment of the present disclosure.

FIG. 7 is a schematic top view of the first mesh-shaped touch electrode, first dummy electrode, first light-emitting element and first signal line of the touch display apparatus according to another embodiment of the present disclosure. The touch display apparatus 10B of FIG. 7 is similar to the touch display apparatus 10A of FIG. 6. The difference between the two is that in the embodiment of FIG. 6, three first light-emitting elements 200 share one first conductive portion 422; in the embodiment of FIG. 7, six first light-emitting elements 200 share one first conductive portion 422.

Figure 8:
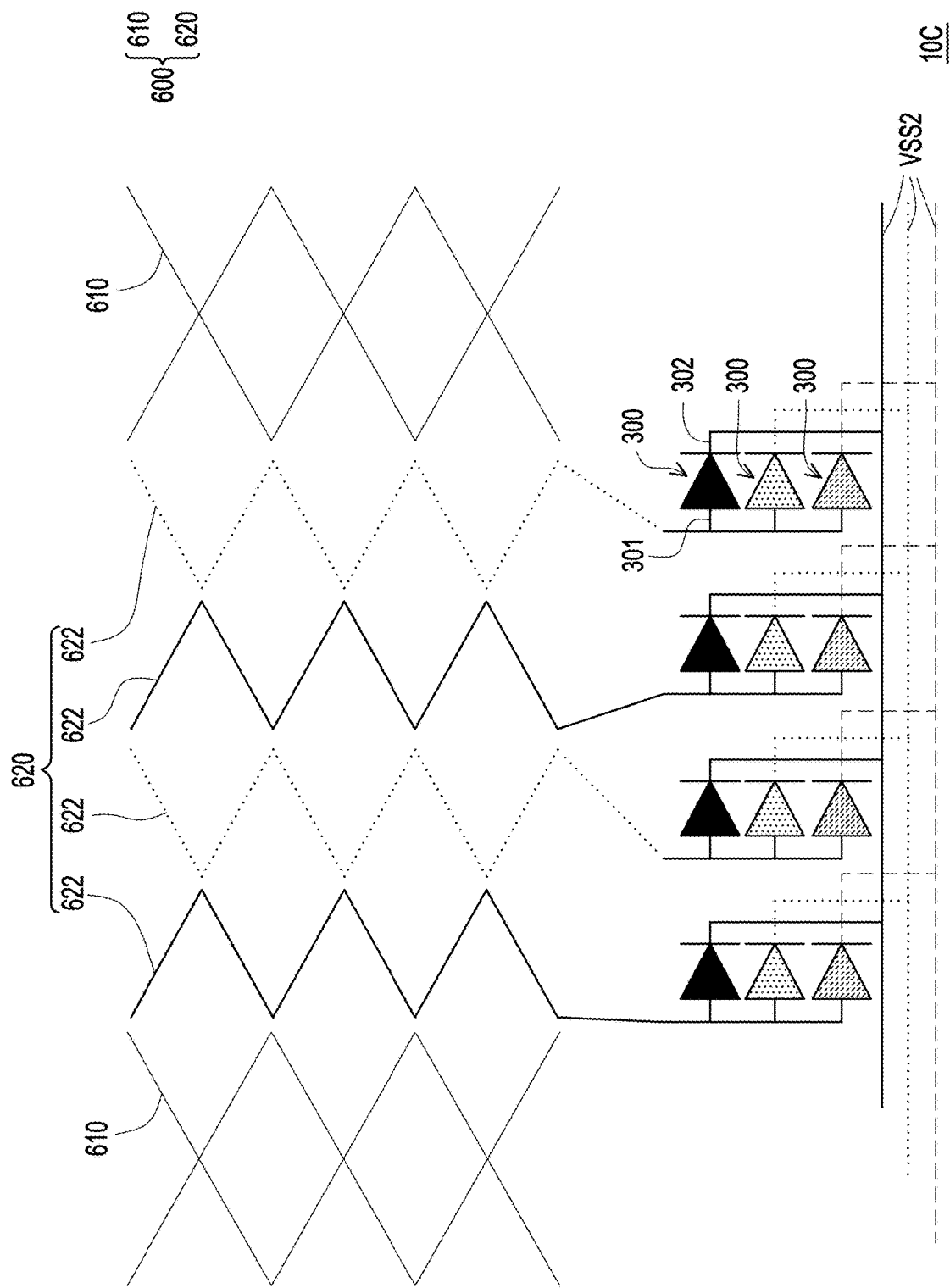
FIG. 8. is a schematic top view of the second mesh-shaped touch electrode, second dummy electrode, second light-emitting element and second signal line of the touch display apparatus according to yet another embodiment of the present disclosure.

FIG. 8 is a schematic top view of the second mesh-shaped touch electrode, second dummy electrode, second light-emitting element and second signal line of the touch display apparatus according to yet another embodiment of the present disclosure. The touch display apparatus 10C of FIG. 8 is similar to the aforementioned touch display apparatus 10. The difference between the two is that in the embodiment of FIG. 8, a second conductive portion 622 of the second dummy electrode 620 may be electrically connected to second light-emitting elements 300, first ends 301 of the second light-emitting element 300 are electrically connected to second signal lines VSS2 respectively, and second ends 302 of the second light-emitting elements 300 are electrically connected to the same second conductive portion 622. That is to say, when the resolution of the touch display apparatus 10C is improved, the second light-emitting elements 300 may share a second conductive portion 622 so as to simplify the circuit design for driving the second light-emitting element 300, wherein the number of the second light-emitting elements 300 sharing the same second conductive portion 622 depends on actual needs.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch display apparatus comprising:
a display panel having a main display area and a first auxiliary display area outside the main display area;
a plurality of first light-emitting elements arranged on the first auxiliary display area of the display panel; and
a first conductive layer disposed on the display panel and comprising:
a plurality of first mesh-shaped touch electrodes located on the main display area of the display panel; and
a plurality of first dummy electrodes located on the main display area of the display panel, wherein each of the first dummy electrodes is disposed between two adjacent first mesh-shaped touch electrodes of the first mesh-shaped touch electrodes and structurally separated from the two adjacent first mesh-shaped touch electrodes, and at least one portion of the each of the first dummy electrodes is electrically connected to at least one of the first light-emitting elements disposed in the first auxiliary display area.

2. The touch display apparatus according to claim 1, wherein the main display area and the first auxiliary display area are arranged in a first direction, each of the first mesh-shaped touch electrodes substantially extends in a first direction, the first mesh-shaped touch electrodes are arranged in a second direction intersecting with the first direction, the display panel further has a second auxiliary display area outside the main display area and the first auxiliary display area, the main display area and the second auxiliary display area are arranged in the second direction, and the touch display apparatus further comprises:
a plurality of second light-emitting elements disposed on the second auxiliary display area;

at least one insulation layer disposed on the first conductive layer; and a second conductive layer disposed on the at least one insulation layer and comprises:

a plurality of second mesh-shaped touch electrodes disposed on the main display area of the display panel and interspersed with the first mesh-shaped touch electrodes; and a plurality of second dummy electrodes disposed on the main display area of the display panel, wherein each of the second dummy electrodes is disposed between two adjacent second mesh-shaped touch electrodes of the second mesh-shaped touch electrodes, the each of the second dummy electrodes and the two adjacent second mesh-shaped touch electrodes are structurally separated from each other, and at least a portion of the second dummy electrodes is electrically connected to at least one of the second light-emitting elements disposed in the second auxiliary display area.

3. The touch display apparatus according to claim 2, wherein the each of the first dummy electrodes comprises first conductive portions structurally separated from each other, the first conductive portions of the each of the first dummy electrodes are electrically connected to the first light-emitting elements disposed in the first auxiliary display area, the first conductive portions of the each of the first dummy electrodes define first dummy grids, and a shape of a first dummy grid of the first dummy grids is substantially the same as a shape of a first grid of the each of the first mesh-shaped touch electrodes.

4. The touch display apparatus according to claim 3, wherein a size of the first dummy grid is substantially the same as the size of the first grid of the each of the first mesh-shaped touch electrodes.

5. The touch display apparatus according to claim 3, wherein each of the first conductive portions comprises first line segments and second line segments, the first line segments and the second line segments are alternately arranged and connected in series, the first line segments are substantially parallel to each other and extend in a third direction, the first direction is substantially perpendicular to the second direction, the third direction intersects with the first direction and the second direction, the second line segments are substantially parallel to each other and extend in a fourth direction, and the fourth direction intersects with the first direction, the second direction and the third direction.

6. The touch display apparatus according to claim 3, wherein a first conductive portion of the first conductive portions of the each of the first dummy electrodes is electrically connected to first light-emitting elements of the first light-emitting elements.

7. The touch display apparatus according to claim 6, wherein first ends of the first light-emitting elements are electrically connected to first signal lines respectively, and second ends of the first light-emitting elements are electrically connected to the first conductive portion.

* * * * *